United States Patent
Alavudin

(10) Patent No.: US 8,982,860 B2
(45) Date of Patent: Mar. 17, 2015

(54) TECHNIQUES FOR AN ACCESS POINT TO OBTAIN AN INTERNET PROTOCOL ADDRESS FOR A WIRELESS DEVICE

(71) Applicant: Intel Corporation, Santa Clara, CA (US)

(72) Inventor: Jalvathi Alavudin, Bangalore (IN)

(73) Assignee: Intel Corporation, Santa Clara, CA (US)

(*) Notice: Subject to any disclaimer, the term of this patent is extended or adjusted under 35 U.S.C. 154(b) by 59 days.

(21) Appl. No.: 13/794,664

(22) Filed: Mar. 11, 2013

(65) Prior Publication Data
US 2014/0254500 A1 Sep. 11, 2014

(51) Int. Cl.
*H04W 4/00* (2009.01)
*H04W 72/04* (2009.01)

(52) U.S. Cl.
CPC .................................. *H04W 72/044* (2013.01)
USPC ......................................................... 370/338

(58) Field of Classification Search
None
See application file for complete search history.

(56) References Cited

U.S. PATENT DOCUMENTS

| | | | |
|---|---|---|---|
| 7,315,519 B2 * | 1/2008 | Sarikaya et al. | 370/310 |
| 2004/0148374 A1 | 7/2004 | Bush et al. | |
| 2004/0240412 A1 | 12/2004 | Winget | |
| 2005/0030945 A1 * | 2/2005 | Sarikaya et al. | 370/389 |
| 2005/0220099 A1 | 10/2005 | Igarashi | |
| 2005/0254653 A1 | 11/2005 | Potashnik et al. | |
| 2006/0018281 A1 * | 1/2006 | Sadot et al. | 370/331 |
| 2006/0050673 A1 * | 3/2006 | Park et al. | 370/338 |
| 2007/0091859 A1 * | 4/2007 | Sethi et al. | 370/338 |
| 2008/0130576 A1 | 6/2008 | Jun et al. | |
| 2013/0243194 A1 * | 9/2013 | Hawkes et al. | 380/270 |
| 2013/0263223 A1 * | 10/2013 | Cherian et al. | 726/4 |

OTHER PUBLICATIONS

International Search Report received for PCT Patent Application No. PCT/US2014/023003, mailed Jul. 25, 2014, 2 pages.

* cited by examiner

*Primary Examiner* — Kevin C Harper
(74) *Attorney, Agent, or Firm* — Kacvinsky Daisak Bluni PLLC

(57) ABSTRACT

Examples are disclosed for an access point (AP) of a wireless local area network (WLAN) capable of obtaining an internet protocol (IP) address on behalf of a wireless device attempting to couple to the WLAN. The access point may receive an association request for the wireless device to couple to the WLAN. The association request may include an indication of whether the wireless device is also requesting an IP address. If an IP address is requested, the AP may obtain an IP address from a Dynamic Host Configuration Protocol (DHCP) server on behalf of the wireless device. Meanwhile, in some examples, the AP may concurrently implement an authentication process to enable the wireless device to couple to the WLAN. For these examples, upon authentication of the wireless device, the AP may provide the obtained IP address to the wireless device. Other examples are described and claimed.

21 Claims, 10 Drawing Sheets

500

```
GENERATE AN ASSOCIATION REQUEST TO COUPLE TO A
WLAN VIA AN ACCESS POINT, THE ASSOCIATION REQUEST
INCLUDING A DHCP IE INDICATING A REQUEST FOR AN IP
ADDRESS FROM A DHCP SERVER
502
```

```
TRANSMIT THE ASSOCIATION REQUEST
504
```

```
RECEIVE AN ASSOCIATION RESPONSE FROM THE ACCESS
POINT
506
```

```
RESPONSIVE TO SUCCESSFUL AUTHENTICATION PROCESS
WITH THE ACCESS POINT, RECEIVE A DHCP ACK MESSAGE
FORWARDED FROM THE ACCESS POINT AND INCLUDING
THE REQUESTED IP ADDRESS PROVIDED BY THE DHCP
SERVER
508
```

*FIG. 5*

Storage Medium 600

*Computer Executable Instructions for 500*

RECEIVE A FIRST ASSOCIATION REQUEST FOR A FIRST WIRELESS DEVICE TO COUPLE TO THE WLAN, THE FIRST ASSOCIATION REQUEST HAVING A DHCP IE THAT INDICATES WHETHER THE FIRST WIRELESS DEVICE IS REQUESTING AN IP ADDRESS FROM A DHCP SERVER
802

SEND A DHCP DISCOVER MESSAGE TO THE DHCP SERVER ON BEHALF OF THE FIRST WIRELESS DEVICE BASED ON THE DHCP IE INDICATING A REQUEST FOR AN IP ADDRESS, RECEIVE A DHCP OFFER MESSAGE, SEND A DHCP REQUEST MESSAGE TO INDICATE A REQUEST FOR A GIVEN IP ADDRESS AND RECEIVE A DHCP ACK MESSAGE GRANTING THE GIVEN IP ADDRESS
804

IMPLEMENT AN AUTHENTICATION PROCESS TO AUTHENTICATE THE FIRST WIRELESS DEVICE FOR COUPLING TO THE WLAN, RESPONSIVE TO THE AUTHENTICATION OF THE FIRST WIRELESS DEVICE, CAUSE THE DHCP ACK MESSAGE TO BE FORWARDED TO THE FIRST WIRELESS DEVICE TO PROVIDE THE GIVEN IP ADDRESS TO THE FIRST WIRELESS DEVICE
806

*FIG. 8*

Storage Medium 900

Computer Executable Instructions for 800

FIG. 9

TECHNIQUES FOR AN ACCESS POINT TO OBTAIN AN INTERNET PROTOCOL ADDRESS FOR A WIRELESS DEVICE

TECHNICAL FIELD

Examples described herein are generally related to wireless devices communicatively coupling to a wireless local area network (WLAN).

BACKGROUND

Wireless devices may include capabilities to access the Internet using various wireless access technologies. For example, these wireless devices may communicatively couple to a wireless local area network (WLAN) using wireless technologies such as Wi-Fi™. A wireless device using Wi-Fi wireless technologies may couple to the WLAN through an access point. Also, before the wireless device can communicate over the Internet an Internet Protocol (IP) address may be obtained from a Dynamic Host Configuration Protocol (DHCP) server.

BRIEF DESCRIPTION OF THE DRAWINGS

FIG. 5 illustrates an example of a first logic flow.
FIG. 6 illustrates an example of a first storage medium.
FIG. 8 illustrates an example of a second logic flow.
FIG. 9 illustrates an example of a second storage medium.

DETAILED DESCRIPTION

Figure 1:
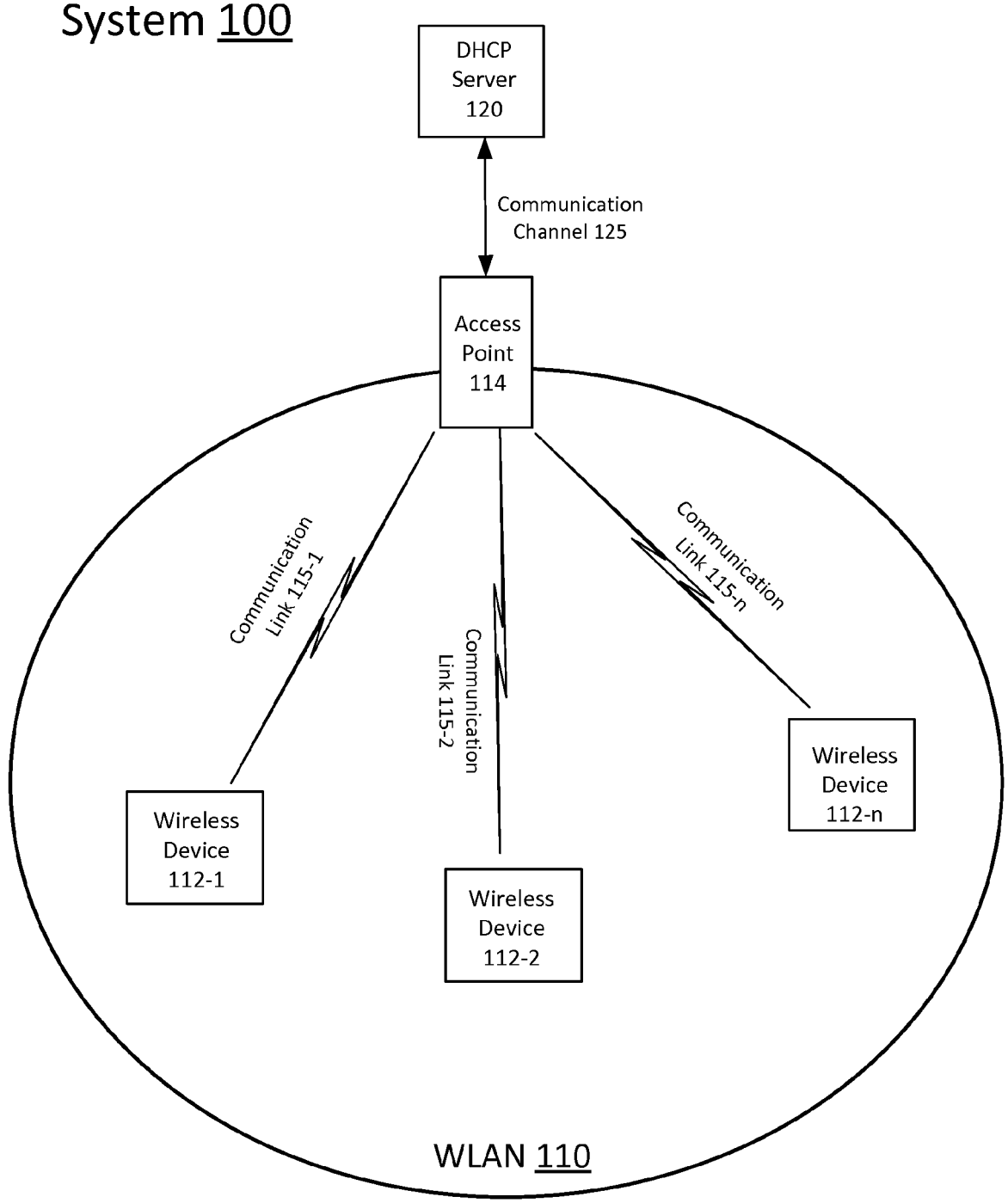
FIG. 1 illustrates an example of a system.

Examples are generally directed to improvements for wireless devices to couple to a WLAN and obtain an IP address using wireless technologies associated with Wi-Fi. These wireless technologies may include wireless technologies suitable for use with wireless devices or user equipment (UE) or access points deployed in a WLAN. For example, wireless devices or access points for a WLAN may be configured to operate in compliance with various WLAN standards promulgated by the Institute of Electrical Engineers (IEEE). These WLAN standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

This disclosure is not limited to WLAN related standards, but may also apply to wireless wide area networks (WWANs) and 3G or 4G wireless standards (including progenies and variants) related to access points, wireless devices, UEs or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

In some examples regarding WLANs, various IEEE standards associated with IEEE 802.11 such as IEEE 802.11a/g, IEEE 802.11ac, IEEE 802.11ad or IEEE 802.11ah may be utilized by wireless devices or access points to establish or maintain communication links within a WLAN. Also, wireless device or access points may seek to obtain IP addresses in accordance with various Dynamic Host Control Protocol (DHCP) standards such as those described in Internet Engineering Task Force (IETF) Request for Comments (RFC) 2131, published March 1997, described in IETF RFC 3315, published July 2003 or described in IETF RFC 6422, published December 2011.

According to some examples, a wireless device may first implement association and authentication processes with an access point for a WLAN in order to couple to the WLAN. Upon successful authentication, the wireless device may then be able to communicate with a DHCP server through the access point. The wireless device may then exchange a series of DHCP messages with the DHCP server to obtain an IP address. Typically, the process of gaining access to the WLAN and then obtaining an IP address from the DHCP server may be characterized as a serial or linear Wi-Fi connection process. This serial or linear process may be time consuming from a perspective of a roaming device that may roam between WLANs. The time consuming Wi-Fi connection process may degrade user experience and may be problematic to achieving a seamless Wi-Fi connection from the user's perspective. It is with respect to these and other challenges that the examples described herein are needed.

In some examples, techniques are implemented for an access point to obtain an IP address for a wireless device. These techniques may include a wireless device generating an Association Request to couple to a WLAN. The Association Request may include a DHCP information element (IE) that indicates whether the wireless device is also requesting an IP address from a DHCP server. The Association Request may be transmitted by the wireless device to an access point for the WLAN. The access point may then be capable of exchanging information with the DHCP server to obtain an IP address on behalf of the wireless device if the DHCP IE indicates a request for the IP address. Concurrently or in parallel, the access point may also be capable of authenticating the wireless device for coupling to the WLAN. According to some examples, following a successful authentication, the access point may forward a DHCP Acknowledgement (ACK) message from the DHCP server. The DHCP ACK message may contain the requested IP address provided by the DHCP server.

FIG. 1 illustrates an example system 100. In some examples, as shown in FIG. 1, system 100 includes a WLAN 110 that includes an access point 114 and wireless devices 112-1, 112-2 and 112-n, where n represents any positive integer greater than 2. As shown in FIG. 1, access point 114 may couple to DHCP server 120 via a communication channel 125. Also, as shown in FIG. 1, wireless devices 112-1, 112-2 and 112-n may couple to access point 114 via communication links 115-1, 115-2 and 115-n, respectively. This disclosure is not limited to only a single access point for a WLAN or to the three wireless devices shown in FIG. 1. Any number of access points and/or wireless devices for a given WLAN is contemplated by this disclosure.

In some examples, WLAN 110 may be arranged to operate according to the one or more wireless network technologies associated with IEEE 802.11. For these examples, wireless devices 112-1 to 112-n may each attempt to establish a Wi-Fi connection to access the Internet via respective wireless communication links 115-1 to 115-n with access point 114. As described more below, wireless devices 112-1 to 112-n may each include logic and/or features to communicate information to access point 114 that may not only indicate a request to access WLAN 110 but may also indicate whether an IP address is being requested from DHCP server 120. Also as described more below, access point 114 may include logic and/or features to concurrently obtain an IP address (if requested) for a given wireless device and also authenticate that wireless device for coupling to WLAN 110. The concurrent actions of obtaining an IP address and authenticating the given wireless device may shorten Wi-Fi connection times for the given wireless device.

According to some examples, communication channel 125 may be arranged or configured as a communication channel including one or more communication links via which access point 114 and DHCP server 120 may exchange information for the access point to obtain an IP address on behalf of wireless devices 112-1, 112-2 or 112-n. These one or more communication links may include various types of wired, wireless or optical communication mediums. For these examples, the communication links may be operated in accordance with one or more applicable communication or networking standards in any version.

Figure 2:
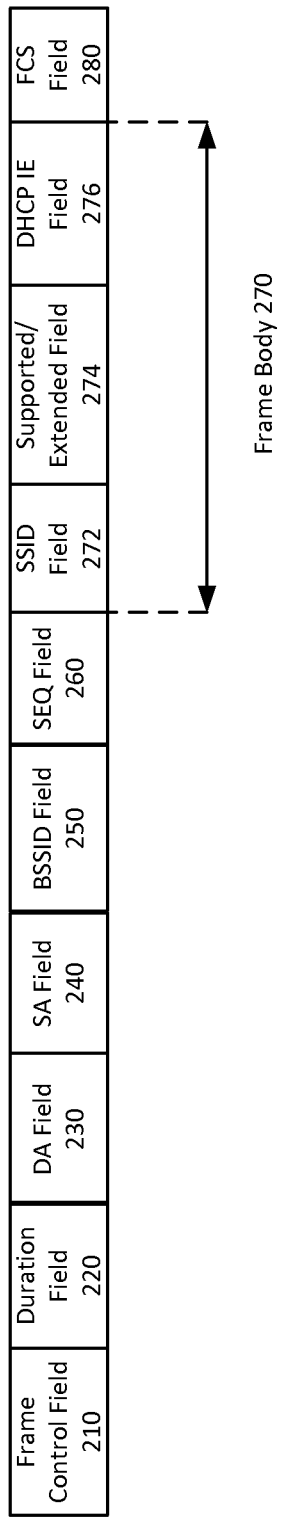
FIG. 2 illustrates an example packet format.

FIG. 2 illustrates an example packet format 200. According to some examples, as shown in FIG. 2, packet format 200 may include a frame control field 210, a duration field 220, a destination address (DA) field 230, a source address field 240, a base service set identification (BSSID) field 250, a sequence (SEQ) field 260, a frame body 270 and a frame control sequence (FCS) field 280. Also, as shown in FIG. 2, frame body 270 includes a service set identification (SSID) field 272, a supported/extended field 274 and a DHCP information element (IE) field 276. Although not shown in FIG. 2, frame body 270 may include additional fields to convey a data payload.

In some examples, packet format 200 may represent an IEEE 802.11 WLAN frame or packet generated by a wireless device (e.g., wireless device 112-1) and used to transmit an Association Request to an access point for a WLAN. For these examples, logic and/or features at the wireless device may be capable of generating a packet in the example packet format of packet format 200 that includes an indication in DHCP IE field 276 of whether the wireless device is requesting an IP address. According to some examples, the indication in DHCP IE field 276 may include one or more bits that when selectively asserted indicate a request for an IP address. For example, an assertion of a given bit in DHCP IE field 276 may represent a flag indicating a request for an IP address. In some examples, DHCP IE field 276 may also include information to indicate a DHCP server via which the IP address is to be requested.

According to some examples, an access point (e.g., access point 114) for a WLAN (e.g., WLAN 110) may include logic and/or features to receive an IEEE 802.11 WLAN frame or packet generated by the wireless device in the example packet format 200 and to determine whether a request for an IP address has been indicated in DHCP IE field 276. If no request is indicated, the access point may then exchange further information with the wireless devices to enable the wireless device to couple to the WLAN. For these examples, the wireless device may already have an active/valid IP address and hence just needs to couple to the WLAN to communicate or access the Internet. In some other examples, if an IP address is requested, the logic and/or features of the access point may then obtain an IP address on behalf of the wireless device. For these other examples, information is concurrently or contemporaneously exchanged with both the wireless device and a DHCP server to both enable the wireless device to communicatively couple to the WLAN and to provide a requested IP address obtained from the DHCP server once the wireless device has been coupled to the WLAN.

Figure 3:
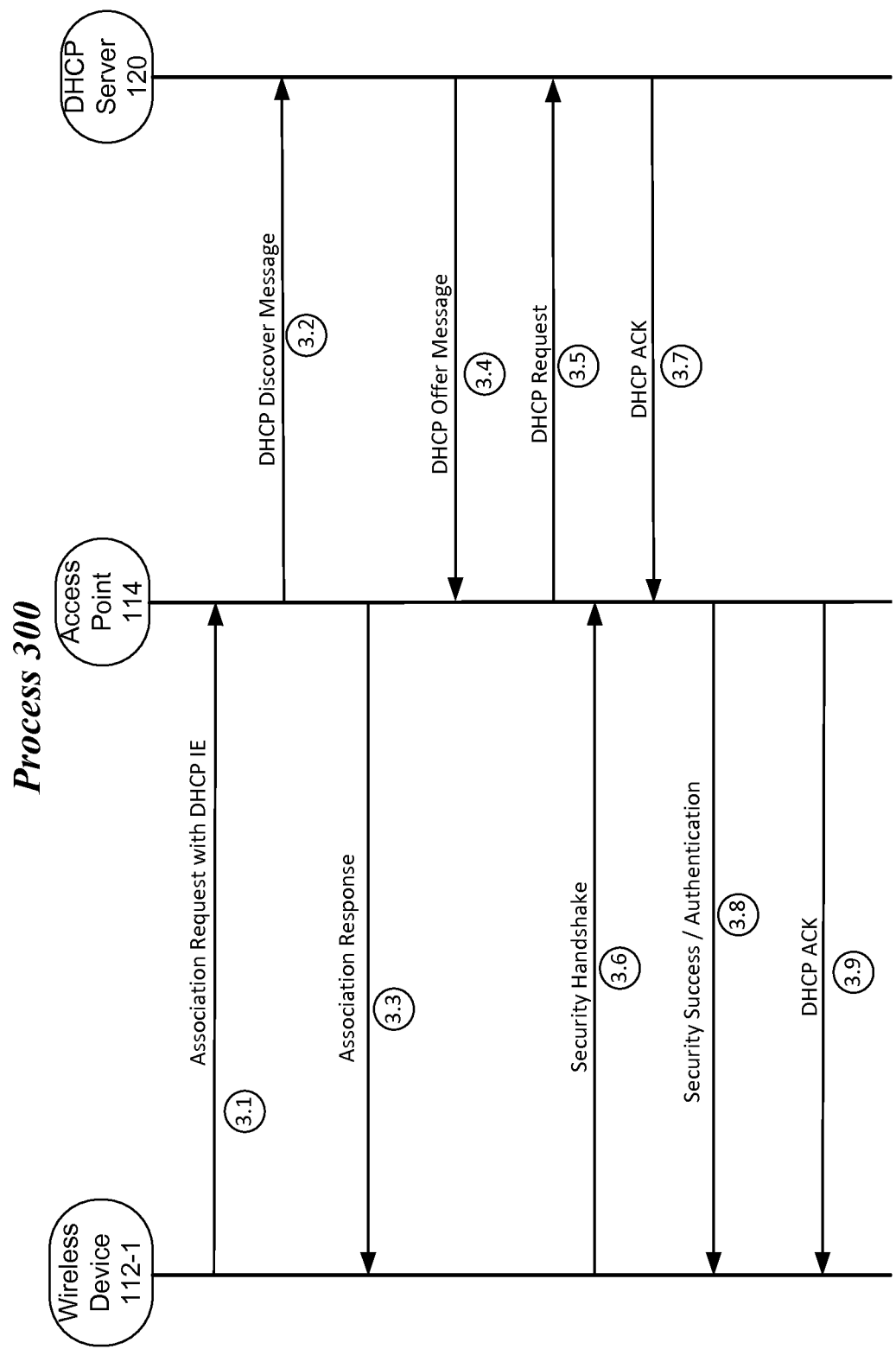
FIG. 3 illustrates an example process.

FIG. 3 illustrates an example process 300. In some examples, process 300 may be for access point 114 to obtain an IP address from DHCP server 120 on behalf of wireless device 112-1 that may be attempting to couple to WLAN 110. For these examples, elements of system 100 as shown in FIG. 1 may be used to illustrate example operations or processes shown in FIG. 3 for process 300. The described example operations are not limited to implementations on system 100.

Beginning at process 3.1 (Association Request with DHCP IE), logic and/or features of wireless device 112-1 may be capable of generating an Association Request with a DHCP IE. In some examples, the logic and/or features may generate the Association Request with the DHCP IE in a packet in the example packet format 200. For these examples, DHCP IE field 276 of the Association Request in example packet format 200 may include an indication that wireless device 112-1 is requesting an IP address from a DHCP server. In some examples, DHCP server 120 may also be indicated in the DHCP IE field as the DHCP server via which the IP address is to be requested.

Proceeding to process 3.2 (DHCP Discover Message), responsive to receiving the Association Request from wireless device 112-1, logic and/or features of access point 114 may determine that an IP address is requested. In some examples, the logic and/or features of access point 114 may identify assertion of a bit in the DHCP IE field as an indication of a need for an IP address. Also, the logic and/or features of access point 114 may refer to the DHCP IE field to determine that DHCP server 120 is the targeted DHCP server for the requested IP address. Alternatively, logic and/or features of access point 114 may independently determine that DHCP server 120 is the targeted DHCP server for the requested IP address. For either of these examples, the logic and/or features of access point may send a DHCP Discover message to DHCP server 120 on behalf of wireless device 112-1 to begin the process of requesting an IP address.

Proceeding to process 3.3 (Association Response), concurrent or contemporaneous with the process of requesting the IP address from DHCP server 120, logic and/or features of access point 114 may cause an Association Response to be transmitted to wireless device 112-1. According to some examples, the Association Response may include information to prompt wireless device 112-1 to provide or exchange authentication information.

Proceeding to process 3.4 (DHCP Offer Message), responsive to the DHCP Discover message sent by access point 114 at process 3.2, DHCP server 120 may transmit a DHCP Offer message to access point 114. In some examples, the DHCP Offer message may include one or more IP addresses that may be available for use by a DHCP client such as wireless device 112-1.

Proceeding to process 3.5 (DHCP Request), logic and/or features of access point 114 may send or cause a DHCP Request message to be sent to DHCP server 120. According to some examples, the DHCP Request message may indicate a request for a given IP address based on selection of the given IP address from among the one or more IP addresses indicated as available in the previously received DHCP Offer message.

Proceeding to process 3.6 (Security Handshake), responsive to receiving the Association Response, logic and/or features of wireless device 112-1 may initiate a security handshake with access point 114. In some examples, the security handshake may include the logic and/or features of wireless device 112-1 generating and transmitting a first Authentication Frame having identification information to initiate the security handshake to allow access point 114 to authenticate wireless device 112-1. In some other examples, the security handshake may include the logic and/or features of wireless device 112-1 initiating a more security intensive four-way handshake process to authenticate wireless device 112-1. The four-way handshake process may be initiated as described in IEEE 802.11i-2004, "Amendment 6: Medium Access Control (MAC) Security Enhancements", published July 2004 ("IEEE 802.11i").

Proceeding to process 3.7 (DHCP ACK), logic and/or features at access point 114 may receive a DHCP ACK message from DHCP server 120. According to some examples, the DHCP ACK message from DHCP server 120 may include a grant of the given IP address selected from among the one or more IP addresses and included in the DHCP Request message sent at process 3.5. For these examples, the logic and/or features at access point 114 may at least temporarily hold on to the DHCP ACK message (e.g., in volatile or non-volatile memory maintained at access point 114) before forwarding the DHCP ACK message to wireless device 112-1. The temporarily holding of the DHCP ACK message may occur if the security handshake has not been completed. If the security handshake had been completed (e.g., wireless device 112-1 has been authenticated) prior to receiving the DHCP ACK message, the DHCP ACK message may be forwarded without a temporarily holding. Also, in some examples, if the security handshake has failed or later fails, the DHCP ACK message may be dropped and not forwarded to wireless device 112-1. For these examples, logic and/or features of access point 114 may send a message to DHCP server 120 that the given IP address indicated in the DHCP ACK message is not being used or is now available for use by other devices.

Proceeding to process 3.8 (Security Success/Authentication), logic and/or features of access point 114 may have completed the security handshake initiated at process 3.6 and may have authenticated wireless device 112-1. In some examples, responsive to receiving the first Authentication Frame sent by wireless device 112-1 at process 3.6, logic and/or features of access point 114 may have generated and transmitted a second Authentication Frame to wireless device 112-1. The second Authentication Frame may include an indication that wireless device 112-1 is authenticated and thus is accepted for coupling to WLAN 110.

In some other examples, the logic and/or features of wireless device 112-1 may have first generated and transmitted a second Authentication Frame responsive to receipt of the first Authentication Frame from wireless device 112-1 at process 3.6. For these other examples, the second Authentication Frame may initiate an IEEE 802.11i four-way handshake process with AP 114. Logic and/or features of access point 114 may capable of authenticating wireless device 112-1 based on information exchanged via the IEEE 802.11i four-way handshake process. The logic and/or features of access point 114 may generate and transmit a third Authentication Frame to wireless device 112-1. The third Authentication Frame may include an indication that wireless device 112-1 is authenticated and thus accepted for coupling to WLAN 110.

Proceeding to process 3.9 (DHCP ACK), the DHCP ACK message is forwarded to wireless device 112-1. According to some examples, as mentioned above, the DHCP ACK may include the IP address granted and/or obtained from DHCP server 120. For these examples, based on authentication and acceptance to couple to WLAN 110 and having an IP address, wireless device 112-1 may now be capable of communicating over the Internet.

Figure 4:
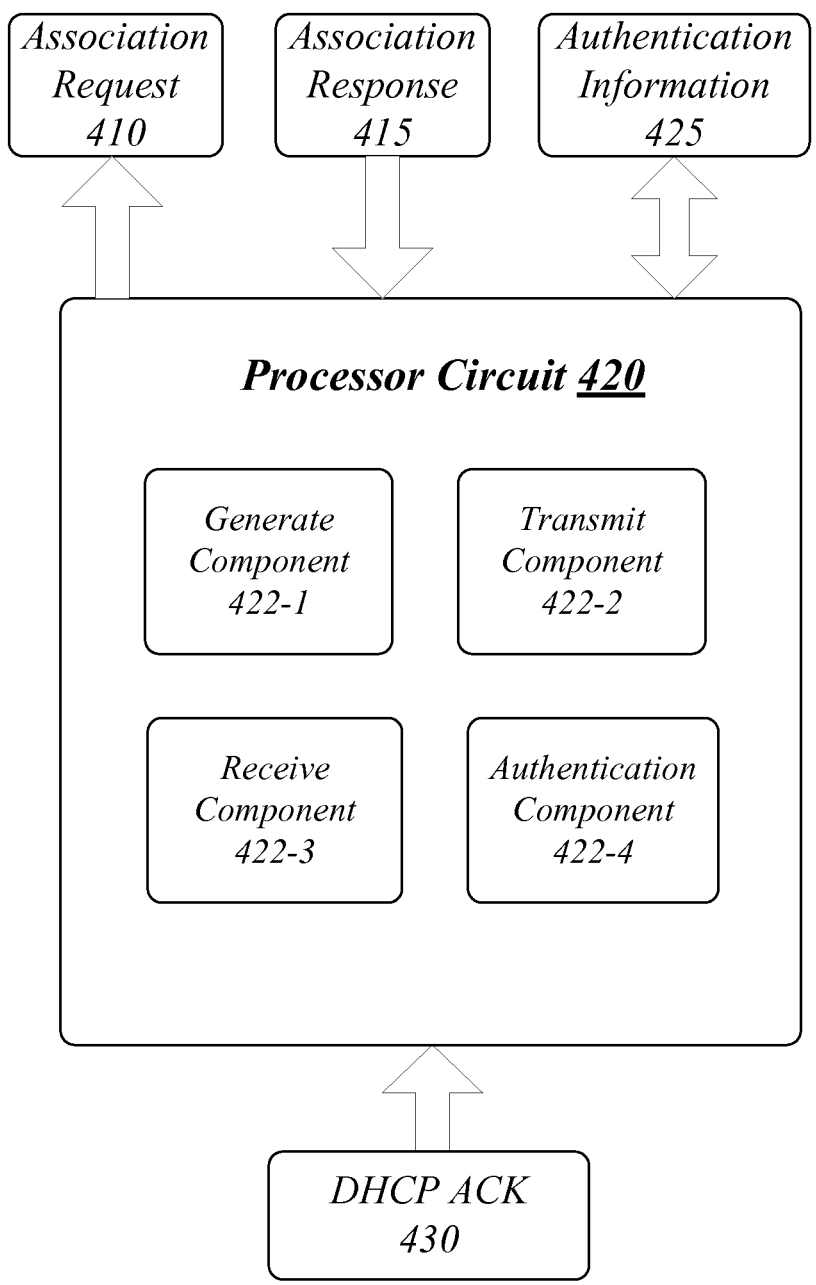
FIG. 4 illustrates an example block diagram for a first apparatus.

FIG. 4 illustrates a block diagram for a first apparatus. As shown in FIG. 4, the first apparatus includes an apparatus 400. Although apparatus 400 shown in FIG. 4 has a limited number of elements in a certain topology or configuration, it may be appreciated that apparatus 400 may include more or less elements in alternate configurations as desired for a given implementation.

The apparatus 400 may comprise a computer-implemented apparatus 400 having a processor circuit 420 arranged to execute one or more software modules or components 422-*a*. It is worthy to note that "a" and "b" and "c" and similar designators as used herein are intended to be variables representing any positive integer. Thus, for example, if an implementation sets a value for a=4, then a complete set of software modules 422-*a* may include modules 422-1, 422-2, 422-3 and 422-4. The embodiments are not limited in this context.

According to some examples, apparatus 400 may be part of a wireless device arranged to operate in compliance with one or more wireless technologies such as those described in or associated with the IEEE 802.11 standards. For example, apparatus 400 may be arranged or configured to communicatively couple to an access point via a wireless communication link or channel established and/or operated according to IEEE 802.11a/g, IEEE 802.11ac, IEEE 802.11ad, IEEE 802.11ah or IEEE 802.11i. The examples are not limited in this context.

In some examples, as shown in FIG. 4, apparatus 400 includes processor circuit 420. Processor circuit 420 may be generally arranged to execute one or more software components 422-*a*. The processor circuit 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 420. According to some examples processor circuit 420 may also be an application specific integrated circuit (ASIC) and modules 422-*a* may be implemented as hardware elements of the ASIC.

According to some examples, apparatus 400 may include a generate component 422-1. Generate component 422-1 may be executed by processor circuit 420 to generate an Association Request 410 to couple to a WLAN via an access point. For these examples, generate component 422-1 may be capable of including a DHCP IE with Association Request 410 that indicates a request for an IP address from a DHCP server. As mentioned in some examples above, the access point may then obtain the requested IP address form the DHCP server on behalf of the wireless device which includes apparatus 400.

In some examples, apparatus 400 may also include a transmit component 422-2. Transmit component 422-2 may be executed by processor circuit 420 to transmit or cause Association Request 410 to be transmitted. For these examples, Association Request 410 may be transmitted or caused to be transmitted to the access point for the WLAN.

In some examples, apparatus 400 may also include a receive component 422-3. Receive component 422-3 may be executed by processor circuit 420 to receive Association Response 415 from the access point. Also, upon successful completion of an authentication process, receive component 422-3 may also receive DHCP ACK 430 from the access point that includes the requested IP address provided for and obtained by the access point.

According to some examples, apparatus 400 may also include an authentication component 422-4. Authentication component 422-4 may be executed by processor circuit 420 to exchange authentication information 425 with the access point to authenticate the wireless device which includes apparatus 400. The exchange of authentication information 425 may include security handshakes involving the exchange of Authentication Frames and/or other information. In some examples, the security handshakes may include a four-way handshake as described in IEEE 802.11i. Also, in some examples, the access point may wait to forward DHCP ACK 430 to the wireless device until the wireless device has been successfully authenticated and therefore accepted by the access point for access to the WLAN.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates an example of a first logic flow. As shown in FIG. 5, the first logic flow includes a logic flow 500. Logic flow 500 may be representative of some or all of the operations executed by one or more logic, features, or devices described herein, such as apparatus 400. More particularly, logic flow 500 may be implemented by generate component 422-1, transmit component 422-2, receive component 422-3 or authentication component 422-4.

In the illustrated example shown in FIG. 5, logic flow 500 may generate an association request to couple to a WLAN via an access point at block 502. For these examples, also at block 502, the Association Request may include a DHCP IE indicating a request for an IP address from a DHCP server. Generate component 422-1 may generate Association Request 410 for access to the WLAN that also include the DHCP IE indicating a request for an IP address. Association Request 410 may be in a packet format of example packet format 200.

According to some examples, logic flow 500 at block 504 may transmit the Association Request. For these examples, transmit component 422-2 may wirelessly transmit or cause the wireless transmission of Association Request 410 to the access point.

In some examples, logic flow 500 at block 506 may receive an Association Response from the access point. For these examples receive component 422-3 may receive Association Response 415 from the access point.

According to some examples, logic flow 500, responsive to a successful authentication process with the access point, may receive a DHCP ACK message forwarded from the access point and including the requested IP address provided by the DHCP server at block 508. For these examples, authentication component 422-2 may receive DHCP ACK 430 following the exchange of authentication information 425 that results in successful implementation of an authentication process that authenticates the wireless device to the access point and therefore accepts the wireless device for access to the WLAN.

FIG. 6 illustrates an embodiment of a first storage medium. As shown in FIG. 6, the first storage medium includes a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
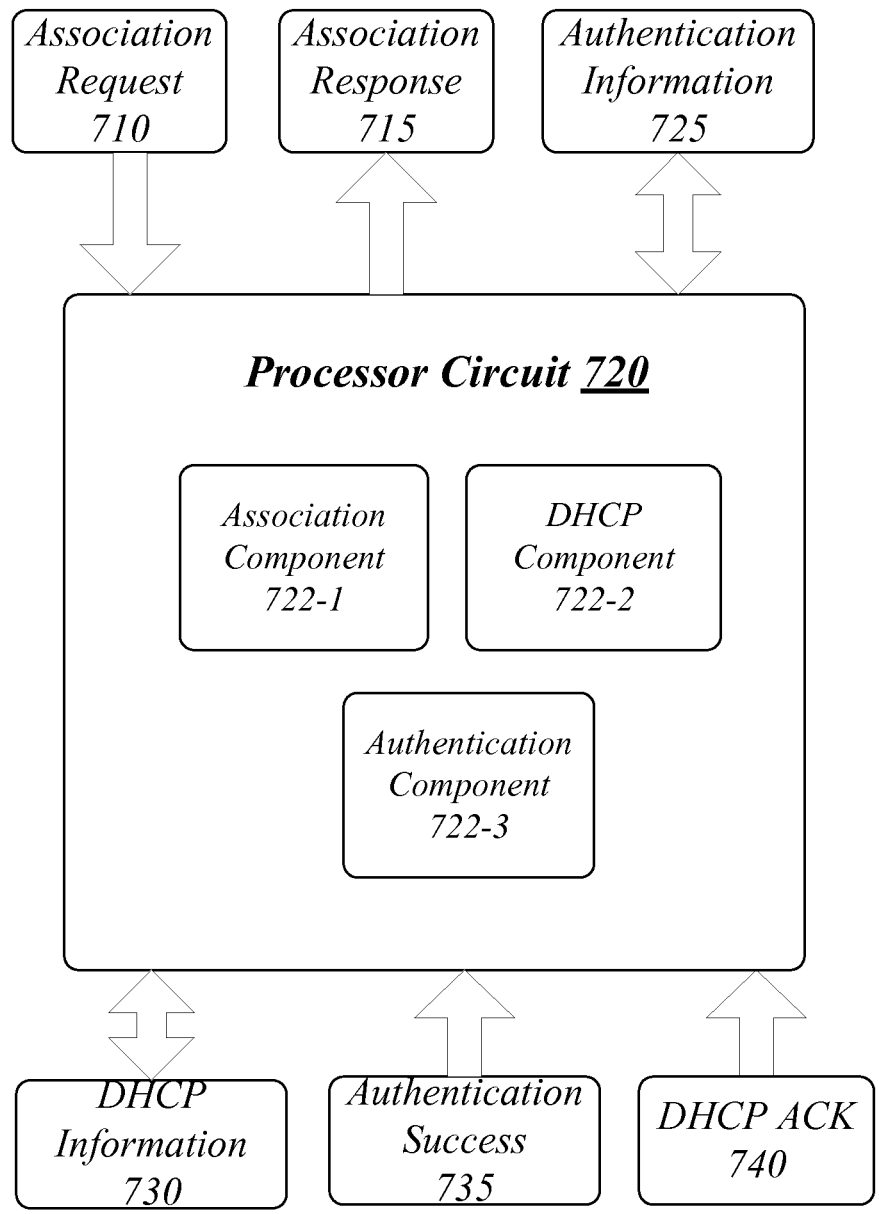
FIG. 7 illustrates an example block diagram for a second apparatus.

FIG. 7 illustrates a block diagram for a second apparatus. As shown in FIG. 7, the second apparatus includes an apparatus 700. Although apparatus 700 shown in FIG. 7 has a limited number of elements in a certain topology or configuration, it may be appreciated that apparatus 700 may include more or less elements in alternate configurations as desired for a given implementation.

The apparatus 700 may comprise a computer-implemented apparatus 700 having a processor circuit 720 arranged to execute one or more software modules or components 722-*a*. Similar to apparatus 400 for FIG. 4, "a" and "b" and "c" and similar designators may be variables representing any positive integer.

According to some examples, apparatus 700 may be part of an access point arranged to operate in compliance with one or more wireless technologies such as those described in or associated with the IEEE 802.11 standards. For example, apparatus 700 may be arranged or configured to communicatively couple to one or more wireless devices via a wireless communication link or channel established and/or operated according to IEEE 802.11a/g, IEEE 802.11ac, IEEE 802.11ad, IEEE 802.11ah or IEEE 802.11i. The examples are not limited in this context.

In some examples, as shown in FIG. 7, apparatus 700 includes processor circuit 720. Processor circuit 720 may be generally arranged to execute one or more software components 722-a. The processor circuit 720 can be any of various commercially available processors to include, but not limited to, those previously mentioned for processing circuit 420 for apparatus 400. Dual microprocessors, multi-core processors, and other multi-processor architectures may also be employed as processor circuit 720. According to some examples processor circuit 720 may also be an application specific integrated circuit (ASIC) and modules 722-a may be implemented as hardware elements of the ASIC.

According to some examples, apparatus 700 may include an association component 722-1. Association component 722-1 may be executed by processor circuit 720 to receive Association Request 710. For these examples Association Request 710 may be a first Association Request received from a first wireless device to couple to a WLAN for an access point including an apparatus 400. Subsequent Association Requests may also be received from one or more other wireless devices attempting to couple to the WLAN. Regarding Association Request 710, this first Association Request may have a DHCP IE that indicates whether the first wireless device is requesting an IP address from a DHCP server.

In some examples, apparatus 700 may also include a DHCP component module 722-2. DHCP component 722-2 may be executed by processor circuit 720 to send a DHCP Discover message to the DHCP server on behalf of the first wireless device based on the DHCP IE in Association Request 710 that indicated a request for an IP address. For these examples, the DHCP component may also receive a DHCP Offer message from the DHCP server that includes one or more IP addresses. DHCP component may then select a given IP address and send a DHCP Request message to indicate a request for the given IP address. DHCP component may then receive a DHCP ACK message granting the given IP address. The exchange of these messages with the DHCP server on behalf of the first wireless device is depicted in FIG. 7 by DHCP Information 730.

In some examples, apparatus 700 may also include an authentication component 722-3. Authentication component 722-3 may be executed by processor circuit 720 to implement an authentication process to authenticate the first wireless device for coupling to the WLAN. Responsive to the authentication of the first wireless device, authentication component 722-3 may cause DHCP component 722-2 to forward DHCP ACK 740 to the first wireless device to provide the given IP address to the first wireless device.

According to some examples, the authentication process may be initiated following association component 722-1 sending an association response 715 to the first wireless device that prompts the first wireless device to exchange authentication information 725 with authentication component 722-3. The exchange of authentication information 725 may include security handshakes involving the exchange of Authentication Frames and/or other information. In some examples, the security handshakes may include a four-way handshake as described in IEEE 802.11i. Also, in some examples, DHCP component 722-2 may wait to forward DHCP ACK 740 to the first wireless device until the first wireless device has been successfully authenticated.

Various components of apparatus 700 and a device implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a second logic flow. As shown in FIG. 8, the second logic flow includes a logic flow 800. Logic flow 800 may be representative of some or all of the operations executed by one or more logic, features, or devices described herein, such as apparatus 700. More particularly, logic flow 800 may be implemented by association component 722-1, DHCP component 722-2 or authentication component 722-3.

In the illustrated example shown in FIG. 8, logic flow 800 at block 802 may receive a first Association Request for a first wireless device to couple to a WLAN accessible via an access point, the first Association Request having a DHCP IE that indicates whether the first wireless device is requesting an IP address from a DHCP server. For these examples, association component 722-1 may receive the first Association Request in Association Request 710.

According to some examples, logic flow 800 at block 804 may send a DHCP Discover message to the DHCP server on behalf of the first wireless device based on the DHCP IE indicating a request for an IP address, the DHCP component to receive a DHCP Offer message, send a DHCP Request message to indicate a request for a given IP address and receive a DHCP ACK message granting the given IP address. For these examples, DHCP component 722-2 may carry out the exchange of DHCP information 730 as mentioned above to obtain the given IP address on behalf of the first wireless device. According to some examples, this exchange of DHCP information 730 may occur concurrently with or contemporaneously with implementing an authentication process.

According to some examples, logic flow 800 at block 806 may implement an authentication process to authenticate the first wireless device for coupling to the WLAN, responsive to the authentication of the first wireless device, the authentication component to cause the DHCP ACK message to be forwarded to the first wireless device to provide the given IP address to the first wireless device. For these examples, authentication component 722-3 may implement the authentication process and may cause DHCP component 722-2 to send DHCP ACK 740 to the first wireless device following successful authentication of the first wireless device. DHCP ACK 740 may include the given IP address and may enable the first wireless device to communicate over the Internet via its connection to the access point and the WLAN.

FIG. 9 illustrates an embodiment of a first storage medium. As shown in FIG. 9, the first storage medium includes a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
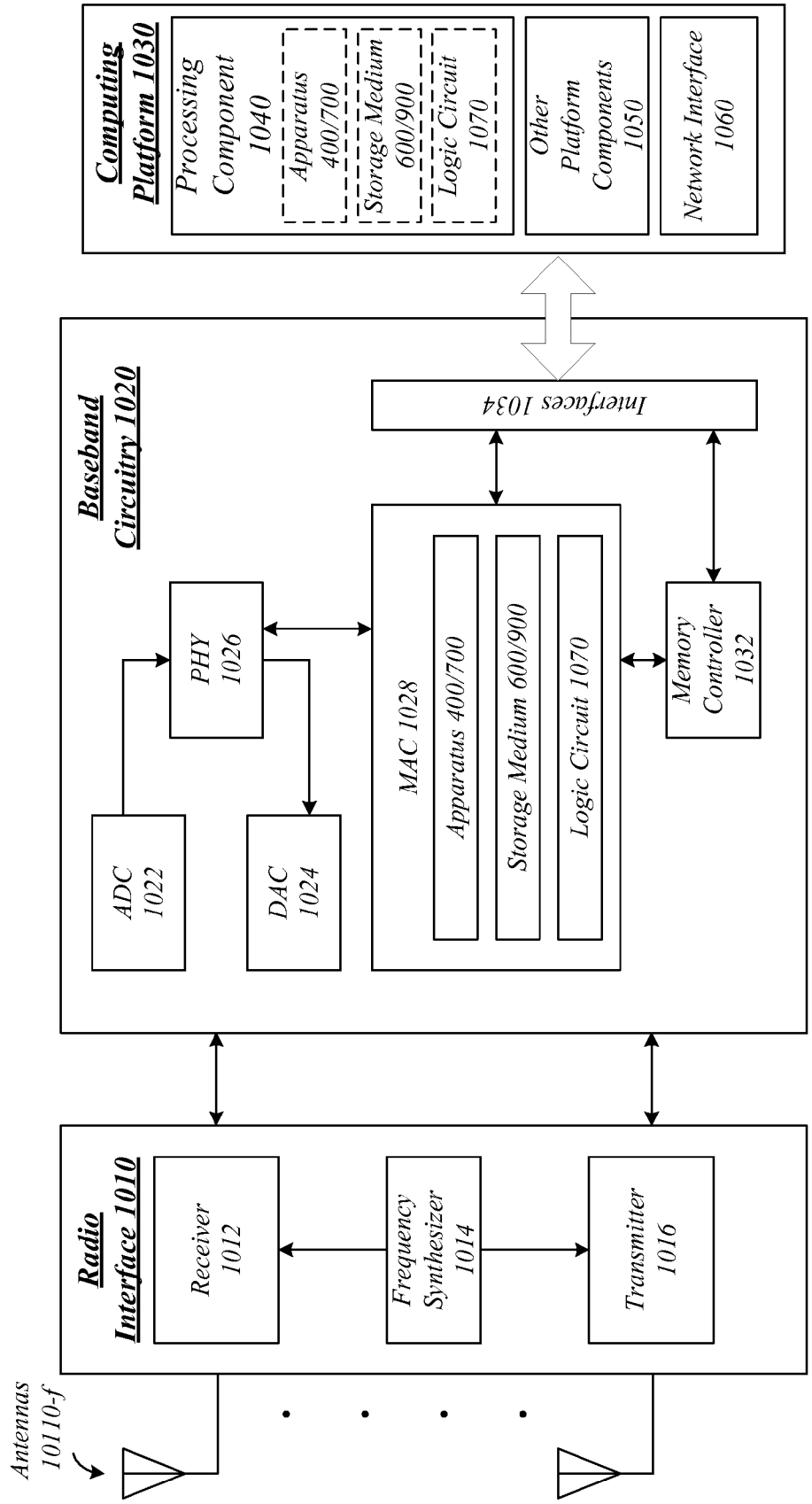
FIG. 10 illustrates an example of a device.

FIG. 10 illustrates an embodiment of a device 1000. In some examples, device 1000 may be configured or arranged for wireless communications in a wireless network. Device 1000 may implement, for example, apparatus 400/700, storage medium 600/900 and/or a logic circuit 1070. The logic circuit 1070 may include physical circuits to perform operations described for apparatus 400/700. As shown in FIG. 10, device 1000 may include a radio interface 1010, baseband circuitry 1020, and computing platform 1030, although examples are not limited to this configuration.

The device 1000 may implement some or all of the structure and/or operations for apparatus 400/700, storage medium 600/900 and/or logic circuit 1070 in a single computing entity, such as entirely within a single device. The embodiments are not limited in this context.

In one example, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-*f*. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for apparatus 400/700, storage medium 600/900, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits (e.g., processor circuit 1020), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11.

Device 1000 may be, for example, user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or sensor networks, although the examples are not limited in this respect.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

According to some examples, an example first apparatus may include a processor circuit for an access point of a WLAN. The example first apparatus may also include an association component to be executed by the processor circuit to receive a first association request for a first wireless device to couple to the WLAN. The first association request may have a DHCP IE that indicates whether the first wireless device is requesting an IP address from a DHCP server. The example first apparatus may also include a DHCP component to be executed by the processor circuit to send a DHCP discover message to the DHCP server on behalf of the first wireless device based on the DHCP IE indicating a request for an IP address. The DHCP component may receive a DHCP offer message, send a DHCP request message to indicate a request for a given IP address and receive a DHCP ACK message granting the given IP address. The example first apparatus may also include an authentication component to be executed by the processor circuit to implement an authentication process to authenticate the first wireless device for coupling to the WLAN. Responsive to the authentication of the first wireless device, the authentication component may cause the DHCP ACK message to be forwarded to the first wireless device to provide the given IP address to the first wireless device.

In some examples for the example first apparatus, the DHCP component may obtain the grant for the given IP address concurrently with or in parallel to authentication component implementing the authentication process.

According to some examples for the example first apparatus, the request for the given IP address may be based on selection of the given IP address from among one or more IP addresses included in the DHCP Offer message.

In some examples for the example first apparatus, the access point may be configured to operate in compliance with at least one or more wireless communication standards associated with the Institute of Electrical and Electronic Engineers (IEEE) 802.11 standards.

According to some examples for the example apparatus, the association component may cause an association response to be transmitted to the first wireless device. Responsive to receiving a first authentication frame from the first wireless device, the authentication component may implement the authentication process by causing a second authentication frame to be transmitted to the wireless device.

In some examples for the example first apparatus, the second authentication frame may indicate that the first wireless device is authenticated.

According to some examples for the example first apparatus, the second authentication frame may cause the authentication component to initiate a four-way handshake process to authenticate the wireless device based on information exchanged with the wireless device. For these examples, the authentication component may cause a third authentication frame to be transmitted to the first wireless device to indicate the first wireless device is authenticated for coupling to the WLAN.

In some examples for the example first apparatus, the association component may receive a second association request for a second wireless device to couple to the WLAN. For these examples, the second association request may have a second DHCP IE that indicates whether the second wireless device is requesting an IP address from the DHCP server. The authentication component may implement the authentication process based on the second DHCP IE indicating no request for an IP address. The authentication process may authenticate the second wireless device for coupling to the WLAN.

According to some examples, the example first apparatus may also include a memory coupled to the processor circuit to at least temporarily maintain the DHCP ACK message at the access point. For these examples, the memory may include one of a non-volatile memory or a volatile memory.

In some examples, example first methods may include generating, at a wireless device, an association request to couple to a WLAN via an access point, the association request including a DHCP IE indicating a request for an IP address from a DHCP server. The example first methods may also include transmitting the Association Request and receiving an association response from the access point, For these examples, responsive to successfully implementing an authentication process with the access point, a DHCP ACK message forwarded from the access point may be received which includes the requested IP address provided by the DHCP server.

According to some examples for the example first methods, the authentication process may be implemented with the access point concurrent with the access point obtaining the requested IP address from the DHCP server on behalf of the wireless device.

In some examples for the example first methods, the wireless device may be configured to operate in compliance with at least one or more wireless communication standards associated with the Institute of Electrical and Electronic Engineers (IEEE) 802.11 standards.

According to some examples for the example first methods, the DHCP IE may be included in a frame body field of an IEEE 802.11 WLAN frame used to transmit the association request.

In some examples for the example first methods, the one or more IEEE 802.11 standards may include IEEE 802.11i. For these examples, the authentication process with the access point may include a four-way handshake to complete the successful implementation of the authentication process to authenticate the wireless device for coupling to the WLAN.

According to some examples for the example first methods the authentication process with the access point may include receiving an Association Response, transmitting a first authentication frame having an identity of the wireless device and receiving a second authentication frame indicating successful implementation of the authentication process to authenticate the wireless device for coupling to the WLAN.

According to some examples, at least one machine readable medium comprising a plurality of instructions that in response to being executed on a system for a wireless device cause the system to carry out the example first method as mentioned above.

According to some examples, an example second apparatus may include a processor circuit for a wireless device to couple to a WLAN via an access point. The example second apparatus may also include a generate component to generate an association request to couple to the WLAN via the access point. The association request may include a DHCP IE indicating a request for an IP address from a DHCP server. The example second apparatus may also include a transmit component to transmit the association request and a receive component to receive an association response from the access point. The example second apparatus may also include an authentication component that may implement an authentication process with the access point. Upon successful implementation of the authentication process by the authentication component, the receive component may receive a DHCP ACK message forwarded from the access point. The DHCP ACK message may include the requested IP address provided by the DHCP server.

In some examples for the example second apparatus, the wireless device configured to operate in compliance with at least one or more wireless communication standards associated with the IEEE 802.11 standards to include IEEE 802.11i. For these examples, the authentication process implemented with the access point to include a four-way handshake to complete the successful implementation of the authentication process to authenticate the wireless device for the wireless device to couple to the WLAN.

In some examples, example second methods may include receiving a first association request for a wireless device to couple to the WLAN. The first association request having a DHCP IE indicating that the first wireless device is requesting an IP address from a DHCP server. A DHCP discover message may then be sent to the DHCP server for the wireless device. A DHCP offer message may then be received from the DHCP server. A DHCP request message to indicate a request for a given IP address may then be sent and a DHCP ACK message may then be received from the DHCP server that grants the given IP address. Also for these example second methods, an authentication process may be implemented to authenticate the wireless device. Responsive to successfully authenticating the wireless device, the example second methods may include causing the DHCP ACK message to be forwarded to the wireless device to provide the given IP address to the first wireless device.

According to some examples for the example second methods, the grant for the given IP address may be obtained concurrently with or in parallel to implementation of the authentication process.

In some examples for the example second methods, the request for the given IP address may be based on selection of the given IP address from among one or more IP addresses included in the DHCP offer message.

According to some examples for the example second methods, the access point and the wireless device may be configured to operate in compliance with at least one or more wireless communication standards associated with the IEEE 802.11 standards.

In some examples for the example second methods, the DHCP IE may be included in a frame body field of an IEEE 802.11 WLAN frame used to transmit the Association Request to the access point.

According to some examples for the example second methods, the one or more IEEE 802.11 standards may include IEEE 802.11i, the authentication process with the wireless device may include a four way security handshake to complete the successful implementation of the authentication process to authenticate the wireless device for coupling to the WLAN.

According to some examples, at least one machine readable medium comprising a plurality of instructions that in response to being executed on a system for an access point cause the system to carry out the example second method as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    a processor circuit for an access point of a wireless local area network (WLAN);
    an association component to be executed by the processor circuit to receive a first association request for a first wireless device to couple to the WLAN, the first association request having a Dynamic Host Configuration Protocol (DHCP) information element (IE) that indicates whether or not the first wireless device is requesting an internet protocol (IP) address from a DHCP server;
    a DHCP component to be executed by the processor circuit to send a DHCP discover message to the DHCP server on behalf of the first wireless device, the DHCP component to receive a DHCP offer message, send a DHCP request message to indicate a request for a given IP address and receive a DHCP acknowledgement (ACK) message granting the given IP address; and
    an authentication component to be executed by the processor circuit to implement an authentication process to authenticate the first wireless device for coupling to the WLAN, responsive to the authentication of the first wireless device, the authentication component to cause the DHCP ACK message to be forwarded to the first wireless device to provide the given IP address to the first wireless device.

2. The apparatus of claim 1, comprising the DHCP component to obtain the grant for the given IP address concurrently with or in parallel to authentication component implementing the authentication process.

3. The apparatus of claim 1, comprising the request for the given IP address is based on selection of the given IP address from among one or more IP addresses included in the DHCP Offer message.

4. The apparatus of claim 1, comprising the access point configured to operate in compliance with at least one or more wireless communication standards associated with the Institute of Electrical and Electronic Engineers (IEEE) 802.11 standards.

5. The apparatus of claim 4, comprising the association component to cause an association response to be transmitted to the first wireless device and responsive to receiving a first authentication frame from the first wireless device, the authentication component to implement the authentication process by causing a second authentication frame to be transmitted to the wireless device.

6. The apparatus of claim 5, comprising the second authentication frame to indicate that the first wireless device is authenticated.

7. The apparatus of claim 5, comprising the second authentication frame to cause the authentication component to initiate a four-way handshake process to authenticate the wireless device based on information exchanged with the wireless device, the authentication component to cause a third authentication frame to be transmitted to the first wireless device to indicate the first wireless device is authenticated for coupling to the WLAN.

8. The apparatus of claim 1, comprising the association component to receive a second association request for a second wireless device to couple to the WLAN, the second association request having a second DHCP IE that indicates whether the second wireless device is requesting an IP address from the DHCP server, the authentication component to implement the authentication process based on the second DHCP IE indicating no request for an IP address, the authentication process to authenticate the second wireless device for coupling to the WLAN.

9. The apparatus of claim 1, comprising a memory coupled to the processor circuit to at least temporarily maintain the DHCP ACK message at the access point, the memory to include one of a non-volatile memory or a volatile memory.

10. A method comprising:
    generating, at a wireless device, an association request to couple to a wireless local area network (WLAN) via an access point, the association request including a Dynamic Host Configuration Protocol (DHCP) information element (IE) indicating whether or not the wireless device is requesting an internet protocol (IP) address from a DHCP server;
    transmitting the association request to cause the access point to send a DHCP discover message to the DHCP server, receive a DHCP offer message, send a DHCP request message for a given IP address, and receive a DHCP acknowledge (ACK) message granting the given IP address;
    receiving an association response from the access point; and
    responsive to successfully implementing an authentication process with the access point, receiving the DHCP ACK message forwarded from the access point and including the given IP address provided by the DHCP server.

11. The method of claim 10, comprising implementing the authentication process with the access point concurrent with the access point obtaining the given IP address from the DHCP server on behalf of the wireless device.

12. The method of claim 10, comprising the wireless device configured to operate in compliance with at least one or more wireless communication standards associated with the Institute of Electrical and Electronic Engineers (IEEE) 802.11 standards.

13. The method of claim 12, comprising the DHCP IE included in a frame body field of an IEEE 802.11 WLAN frame used to transmit the association request.

14. The method of claim 12, comprising the one or more IEEE 802.11 standards to include IEEE 802.11i, the authentication process with the access point to include a four-way handshake to complete the successful implementation of the authentication process to authenticate the wireless device for coupling to the WLAN.

15. The method of claim 12, comprising the authentication process with the access point to include receiving an Association Response, transmitting a first authentication frame having an identity of the wireless device and receiving a second authentication frame indicating successful implementation of the authentication process to authenticate the wireless device for coupling to the WLAN.

16. At least one non-transitory machine readable medium comprising a plurality of instructions that in response to being executed on a system for an access point for a wireless local area network (WLAN) cause the system to:
receive a first association request for a wireless device to couple to the WLAN, the first association request having a Dynamic Host Configuration Protocol (DHCP) information element (IE) indicating whether or not the first wireless device is requesting an internet protocol (IP) address from a DHCP server;
send a DHCP discover message to the DHCP server for the wireless device;
receive a DHCP offer message from the DHCP server;
send a DHCP request message to indicate a request for a given IP address and receive a DHCP acknowledgement (ACK) message granting the given IP address; and
implement an authentication process to authenticate the wireless device and responsive to successfully authenticating the wireless device, cause the DHCP ACK message to be forwarded to the wireless device to provide the given IP address to the first wireless device.

17. The at least one non-transitory machine readable medium of claim 16, comprising the grant for the given IP address obtained concurrently with or in parallel to implementation of the authentication process.

18. The at least one non-transitory machine readable medium of claim 16, comprising the request for the given IP address is based on selection of the given IP address from among one or more IP addresses included in the DHCP offer message.

19. The at least one non-transitory machine readable medium of claim 16, comprising the access point and the wireless device configured to operate in compliance with at least one or more wireless communication standards associated with the Institute of Electrical and Electronic Engineers (IEEE) 802.11 standards.

20. The at least one non-transitory machine readable medium of claim 19, comprising the DHCP IE included in a frame body field of an IEEE 802.11 WLAN frame used to transmit the association request to the access point.

21. The at least one non-transitory machine readable medium of claim 19, comprising the one or more IEEE 802.11 standards to include IEEE 802.11i, the authentication process with the wireless device to include a four way security handshake to complete the successful implementation of the authentication process to authenticate the wireless device for coupling to the WLAN.

* * * * *

UNITED STATES PATENT AND TRADEMARK OFFICE
CERTIFICATE OF CORRECTION

| | | |
|---|---|---|
| PATENT NO. | : 8,982,860 B2 | Page 1 of 1 |
| APPLICATION NO. | : 13/794664 | |
| DATED | : March 17, 2015 | |
| INVENTOR(S) | : Jalvathi Alavudin | |

It is certified that error appears in the above-identified patent and that said Letters Patent is hereby corrected as shown below:

In the claims

In column 18, line 53, in claim 10, delete "the DHCP ACK" and insert -- a DHCP acknowledgement (ACK) --, therefor.

Signed and Sealed this
Fifteenth Day of December, 2015

Michelle K. Lee
*Director of the United States Patent and Trademark Office*